(12) United States Patent
Hayward

(10) Patent No.: US 8,997,585 B2
(45) Date of Patent: Apr. 7, 2015

(54) FLUID FLOW MONITOR

(75) Inventor: Peter Hayward, Haslemere (GB)

(73) Assignee: Fotech Solutions Limited, London (GB)

( * ) Notice: Subject to any disclaimer, the term of this patent is extended or adjusted under 35 U.S.C. 154(b) by 172 days.

(21) Appl. No.: 13/699,450

(22) PCT Filed: May 24, 2011

(86) PCT No.: PCT/GB2011/000789
§ 371 (c)(1),
(2), (4) Date: Nov. 21, 2012

(87) PCT Pub. No.: WO2011/148128
PCT Pub. Date: Dec. 1, 2011

(65) Prior Publication Data
US 2013/0061688 A1 Mar. 14, 2013

(30) Foreign Application Priority Data

May 26, 2010 (GB) .................................. 1008823.5

(51) Int. Cl.
G01D 5/353 (2006.01)
E21B 47/12 (2012.01)
G01F 1/66 (2006.01)

(52) U.S. Cl.
CPC .............. *G01D 5/353* (2013.01); *E21B 47/123* (2013.01); *G01F 1/661* (2013.01); *G01F 1/666* (2013.01)

(58) Field of Classification Search
CPC ... G01N 29/2418; G01N 29/14; G01H 9/004; G01H 5/00; G01H 3/00; G01M 3/246
USPC ........... 73/40.5, 861.27, 592, 645, 655, 865.8
See application file for complete search history.

(56) References Cited

U.S. PATENT DOCUMENTS

| 8,402,834 | B1* | 3/2013 | Moslehi et al. ................. 73/705 |
| 8,578,759 | B2* | 11/2013 | Calvo et al. ................. 73/40.5 A |
| 2002/0064331 | A1 | 5/2002 | Davis et al. |
| 2006/0104561 | A1 | 5/2006 | Ivtsenkov |
| 2007/0283751 | A1 | 12/2007 | Van Der Spek |
| 2008/0142212 | A1 | 6/2008 | Hartog et al. |
| 2009/0116000 | A1* | 5/2009 | Kiddy et al. ................. 356/73.1 |

(Continued)

FOREIGN PATENT DOCUMENTS

| GB | 2122337 A | 1/1984 |
| GB | 2359834 A | 9/2001 |
| GB | 2408327 A | 5/2005 |
| GB | 2412966 A | 10/2005 |

(Continued)

OTHER PUBLICATIONS

Great Britain Search Report for Application No. GB1008823.5, Date of Search: Sep. 29, 2010, 2 pages.

(Continued)

*Primary Examiner* — Jewel V Thompson
(74) *Attorney, Agent, or Firm* — K&L Gates LLP

(57) ABSTRACT

There are disclosed methods and apparatus for monitoring fluid flow along a conduit such as a well bore or a pipeline. A sensor optical fiber is disposed along the conduit, and an optical interrogator is used to launch probe light pulses into the fiber and to determine optical properties of probe light backscattered within the fiber, the properties being indicative of vibration as a function along the fiber. An analyzer is used to detect one or more vibration features moving along the conduit and to determine a measure of fluid flow based on the detected movement.

28 Claims, 3 Drawing Sheets

(56) References Cited

U.S. PATENT DOCUMENTS

| | | |
|---|---|---|
| 2009/0304322 A1 | 12/2009 | Davies et al. |
| 2010/0229662 A1* | 9/2010 | Brower ............... 73/865.8 |
| 2011/0139447 A1* | 6/2011 | Ramos et al. ......... 166/254.2 |
| 2011/0139538 A1 | 6/2011 | Hill et al. |
| 2011/0291025 A1* | 12/2011 | Fortin et al. ........... 250/458.1 |
| 2012/0227504 A1* | 9/2012 | Goldner et al. ........ 73/655 |
| 2013/0070235 A1* | 3/2013 | Chen et al. ............ 356/73 |
| 2013/0319121 A1* | 12/2013 | Hill et al. .............. 73/645 |
| 2013/0333474 A1* | 12/2013 | Godfrey et al. ........ 73/592 |
| 2014/0069173 A1* | 3/2014 | Roy et al. .............. 73/40.5 A |
| 2014/0123759 A1* | 5/2014 | Minto et al. ........... 73/592 |

FOREIGN PATENT DOCUMENTS

| | | |
|---|---|---|
| GB | 2457278 A | 8/2009 |
| GB | 2469709 A | 10/2010 |
| WO | 2006/048647 A2 | 5/2006 |
| WO | 2008/056143 A1 | 5/2008 |
| WO | 2010/017993 A2 | 2/2010 |

OTHER PUBLICATIONS

PCT International Search Report for Application No. PCT/GB2011/000789, Date of Mailing: Nov. 15, 2011, 4 pages.

PCT Written Opinion of the International Searching Authority, Date of Mailing: Nov. 15, 2011, 6 pages.

* cited by examiner

FLUID FLOW MONITOR

CROSS REFERENCE TO RELATED APPLICATIONS

This application is the national phase under 35 U.S.C. §371 of International Application No. PCT/GB2011/000789, filed on May 24, 2011, which claims priority to and the benefit of U.K. Patent Application No. 1008823.5, filed on May 26, 2010, the entire disclosures of each of which are incorporated by reference herein.

The invention provides a method of monitoring fluid flow in a conduit. The invention may be applied, for example, to monitoring production flow in a gas or oil well, or to monitoring fluid flow along a pipeline.

INTRODUCTION

The monitoring of fluid flow in a hydrocarbon well or other down-hole environment can provide the operator with a number of benefits. These may include, for example, the ability to better optimise production from the well, to help monitor fluid composition, and to assist in monitoring the mechanical health or potential damage to down-hole components such as pumps which may be vulnerable to erosion and similar problems.

In the oil industry there are traditionally two main classes of down-hole flow sensor installation: permanent, and intervention. Permanent installations are rather less common than the intervention type. However, both tend to be complex and need a power supply for the down-hole sensor. This could be in the form of a cable supply from the surface, or a local battery. The sensors need to operate in harsh, potentially dangerous environments, and electrical discharges have the potential for catastrophic results. Permanent installations also tend to be large, associated with high operational expenditure, and require installation either during the initial well completion stage, or during scheduled recompletion activities. Well intervention flow sensor installations are used for periodic production logging, provide only temporary monitoring, and still require well recompletion activity for their installation.

Any well intervention activity is considered costly (and thus undesirable), in that not only is the well in a non-producing state while the monitoring equipment is deployed, but steady-state production will only be re-achieved once the well state has returned to a stable-state. This re-stabilisation period can last from as little as a few hours up to as long as a number of weeks.

Production logging is an activity that is carried out on a periodic basis for the purpose of providing a well log for a number of production measurands, including for example temperature, pressure, and fluid flow rates. During production logging activity the well is taken out of service and the required sensors are installed. Thereafter the well is brought back into service and the sensor of interest is 'run-in' to the required depth. This is achieved either with the aid of gravity or a 'tractor' (a propelled mechanical device that assists deployment). Once at the required depth, and once the well is again producing to the required standard, flow data will be logged for a predefined period. When this operation is complete the sensor will be redeployed to a further location within the well and the logging procedure will be repeated. This whole activity is repeated a number of times (dependant on the well architecture) until the entire length of the well (or region) of interest has been logged. When this data has been gathered the well will again be taken out of service in order to enable the temporary sensor to be removed.

With such intervention methods of flow monitoring it is possible to use measurements of fluid flow at a number of separate locations to provide a combined view across the whole of the down-hole environment. This has the benefit of providing both gross flow and zonal flow information. This can subsequently allow the operator to understand relative contributions of each production zone and thus enable production activities to be optimised (for example by plugging certain non-producing regions etc). With permanent installations it is often only possible to provide gross-flow information, and dependant on the location of the sensor this may only relate to partial-production gross-flow. In either type of installation, sensors only provide point measurements, and it is only possible to obtain flow profile information for a whole well with the deployment of multiple sensors.

It would be desirable to address problems and limitations of the related prior art.

SUMMARY OF THE INVENTION

The invention provides for the sensing and measurement of the velocity or velocity profile of fluid flowing in a conduit, such as within an oil or gas well, using an optical-fibre based, distributed, vibro-acoustic sensing method. A distributed optical fibre sensor permits measurements of vibrations in the environment about a sensor fibre as a function along the length of the fibre, providing data for which a large number of discrete sensors would otherwise be needed.

An interrogator is arranged to measure properties of probe light backscattered within the sensor optical fibre, and these properties are used to determine a measure of the vibrational excitation exerted on the sensor fibre. Fluid flowing through the conduit will cause vibrations which couple into the sensor fibre. For example, the fluid may flow over or across a structure incorporating the sensor fibre, causing vibration in the structure and consequently the sensor fibre. The vibration at the sensor fibre could be due to mechanical coupling to the fluid flow, through coupling of acoustic waves resulting from the dynamics of the fluid flow, or through other means.

The vibration at the sensor fibre may be detected by analysing various properties of backscattered probe light. In some embodiments relative changes in the intensity of light backscattered from a particular part of the fibre may be interpreted as relative changes in vibrational intensity, although a variety of other more complex schemes may be used for example phase-sensitive optical-time-domain-reflectometry (OTDR), which is based on a form of coherent OTDR. In any case, as the fluid flows along the conduit in the vicinity of the sensor optical fibre, spatially localised features in the detected vibrational excitation are tracked as they move along the sensor fibre, and the velocity of this movement then provides a measure of the fluid flow velocity.

It is becoming common practice to install optical fibres at the initial completion stage of oil or gas wells, so a large majority of currently operated oil and gas wells are fitted with existing optical fibres. Some of these optical fibres are provided for optical-fibre distributed-temperature-sensing (DTS). The present invention may utilise such optical fibres for fluid flow monitoring purposes. Where a pre-installed optical fibre is not available in a pre-existing production well, a single, simple well intervention period would be required for the deployment of a suitable optical-fibre structure. For new wells, an additional, suitable optical-fibre structure may be installed during the initial well completion stage. In either case, once the optical-fibre is installed no further well intervention (and associated costly lost production time) need be incurred.

Once the sensor optical fibre is installed in the well the invention provides for either a permanent or periodic flow metering capability as required by the well operator. Moreover, as the distributed optical fibre sensor effectively fulfils the same role as a large number of discrete sensors the invention enables both gross and zone based production flow information to be derived across the whole of a well, including any branches, subject only to appropriate installation of sensor fibre. Flow velocities at particular locations of interest, for example in prime to production zones or where wells are multi-lateral may be derived, as well as gross velocities for example near the well head.

Furthermore, embodiments of the invention are intrinsically safe in harsh or adverse environments. The sensor fibre may be provided by a conventional, telecommunications grade optical-fibre, requiring only probe light to travel along its path in order to ascertain flow velocities in the monitored areas. No electronics are required in the well, and the sensor optical fibre will emit no dangerous electrical discharges.

The invention may also be applied to fluid flowing in other types of conduit, such as water boreholes, flexible and rigid risers, and pipelines.

Accordingly, the invention provides a method of monitoring fluid flow along a conduit, comprising: using an interrogator optically coupled to a sensor optical fibre disposed along a length of the conduit to measure vibration signals at a plurality of locations along the fibre by detecting properties of light backscattered within the fibre from the plurality of locations; detecting movement along the optical fibre of a feature in the vibration signals; and determining a measure of the fluid flow from said detected movement. The method may also include a preliminary step of disposing the sensor optical fibre along a length of the conduit.

The measure of fluid flow may be determined automatically, manually for example from a graphical output of the vibration signal, or semi-automatically for example by manual identification of suitable features followed by automatic analysis of the movement of such features.

The vibration signal may be within particular frequency bands, or over broad ranges of acoustic wavelengths and/or frequencies, and may represent detected acoustic waves and/or other vibrational modes. For example in an oil well, noise resulting from medium flow is typically broadband in nature, with fluid flow noise typically ranging over 0-2000 $H_z$, and sand flow over 0-4000 H. The features in the vibration signal which are detected and tracked may be spatial peaks or troughs in total vibrational signal or power, periodic signals, features in particular frequency bands or combinations of features in different frequency bands, or any other identifiable feature which moves along the sensor fibre over to time. The measure of fluid flow may then be determined from a rate of movement of the features along the sensor optical fibre, or from some other aspect of the behaviour of the features. In particular, the measure of fluid flow may be a measure of velocity of the fluid flow, or some related measure such as volume flow rate which can be derived from the velocity. For example, in a single is phase flow in an oil or gas well the flow volume can be simply calculated from the flow velocity and the diameter of the production tubing. In mixed phase flow, for example a mixture of gas and water, the movement of features in the vibration signals may be caused by either flow of gas or of water, and further on-site testing may be required to determine which of these is giving rise to the moving feature, and what the relationship to production flow should be.

The properties of light backscattered within the fibre may be properties of light which has been Rayleigh backscattered within the sensor optical fibre. For example the intensity of Rayleigh backscattering may be used. The properties, such as intensity, may be normalised for each part of the sensor fibre so that only changes in the properties likely to indicate feature movement, for example to exclude long term drift and background signals. For example, a ratio of the instantaneous intensity and a longer term average of intensity at a given location of the fibre may be used.

In particular, phase sensitive optical time domain reflectometry may be used in which a time domain self interference pattern (temporal speckle pattern) of an at least partially coherent probe light pulse is detected. Vibrations imposed on the sensor fibre cause strain and associated variations in refractive index, which lead to changes in the self-interference pattern at a point in the time domain of the detected light which corresponds to the spatial position of the vibrations. The strength or other properties of these changes, for example between successive pulses, may be used as or to derive the vibration signal mentioned above.

According to another aspect the invention provides a method of monitoring fluid flow along a well bore comprising: using a distributed fibre optical sensor extending along the well bore to detect signals arising from fluid flow along the well bore; identifying one or more features in said signals; measuring movement along the well bore of said features; and monitoring said fluid flow using said measured movement. The signals may be signals indicative of mechanical vibration arising from said fluid flow, and monitoring said fluid flow may comprise determining a velocity of said fluid flow at a plurality locations along said well bore.

Advantageously, the invention may be used to monitor the fluid flow in a plurality of locations along the conduit, for example simultaneously or over a common time period. A composite indication of fluid flow, for example a differential or total flow at some part of the conduit, may then be derived from a plurality of measures of fluid flow from the plurality of locations.

The invention also provides apparatus arranged to implement the above methods, for example apparatus comprising: a sensor optical fibre disposed along a conduit; an optical interrogator arranged to launch probe light pulses into said sensor optical fibre and to determine properties of said probe light backscattered within the sensor optical fibre, said properties being indicative of mechanical vibration at said sensor optical fibre; and an analyser arranged to automatically analyse said properties to detect one or more vibration features moving along said conduit. The apparatus may also automatically analyse the movement of the features to determine a measure of fluid flow from the movement of said one or more features.

The conduit may, in particular, be a well bore, for example the well bore of an oil or gas well, and the sensor optical fibre may be used for production monitoring of flow rates simultaneously in multiple zones or regions of the well. Alternatively, the conduit may be a pipeline, such as a water, oil or gas pipeline, installed overground, underground, or on or under a sea bed. The sensor optical fibre may be installed within, on the outside, or in a wall of the conduit, for example in a well bore casing or in the fluid flow itself. Typically the sensor optical fibre may be housed within a tube installed or disposed along the conduit, for example along an outside, inside or within a wall of the conduit. The tube may be, for example, a stainless steel, plastic or carbon fibre tube, and such a tube may be filled with a fluid such as a silicon oil, or a water based fluid. The fluid filling the tube may thereby help to transmit vibration from the walls of the tube to the sensor optical fibre.

Where the conduit is a well bore, the fibre may be installed, in a tube if required, on or in the structure of the well bore casing, or on the outside of an additional instrument string.

The sensor fibre may be installed along or around the outside of a conduit, for example in a helically wound arrangement.

BRIEF SUMMARY OF THE DRAWINGS

Embodiments of the invention will now be described, by way of example only, and with reference to the accompanying drawings of which.

DETAILED DESCRIPTION OF PREFERRED EMBODIMENTS

Figure 1:
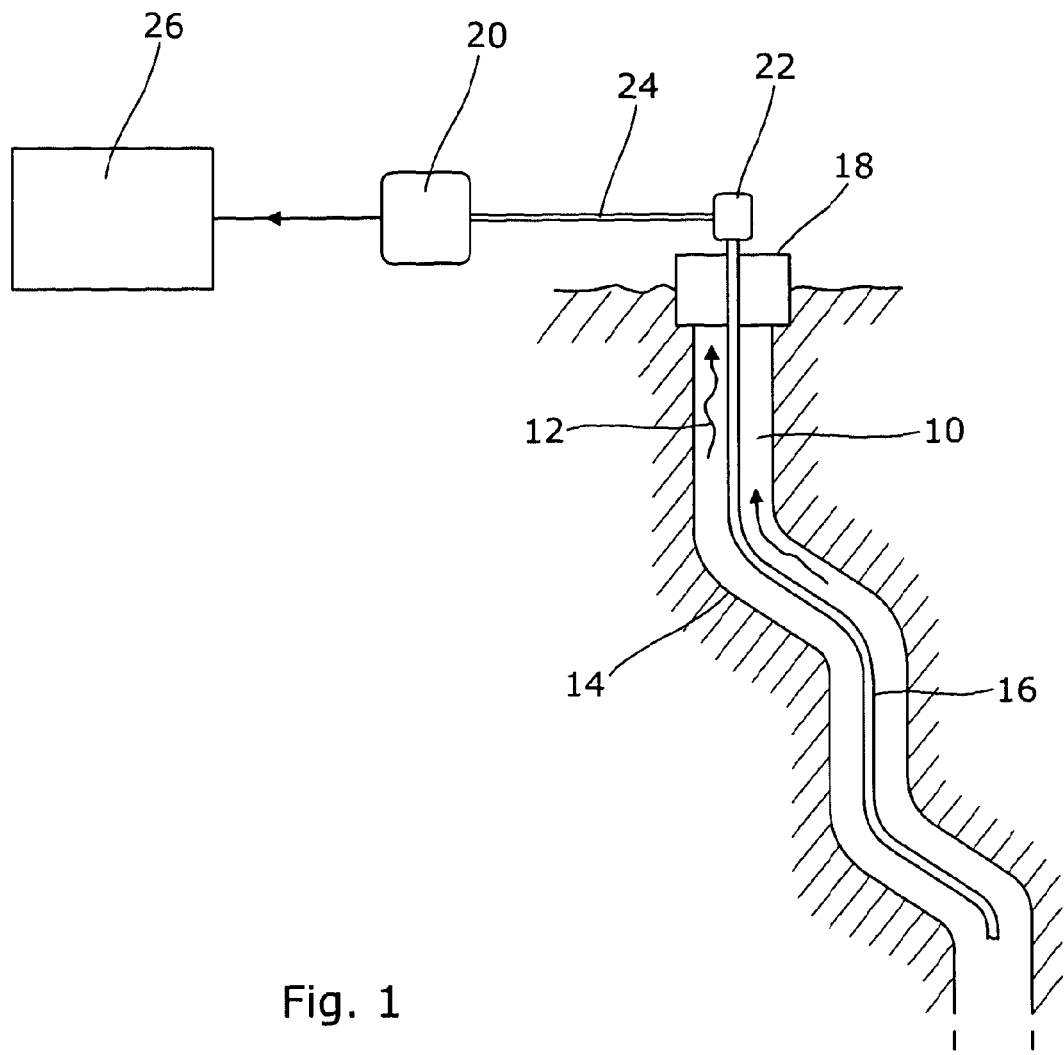
FIG. 1 shows schematically an embodiment of the invention implemented in an oil or gas well.

Referring now to FIG. 1 there is shown, schematically, apparatus for monitoring fluid flow in a conduit 10 which carries a flowing fluid 12. In this example the conduit is provided by a well bore 14 which could be part of an oil well or similar. A sensor optical fibre 16 which enters the wellhead through a conventional fibre penetration system 18, and extends along the conduit. The sensor optical fibre is optically coupled to an interrogator unit 20 by an optical coupling 22 and a link optical fibre 24. The interrogator 20 generates probe light using one or more lasers, and launches the probe light into the sensor optical fibre 16. Some of the probe light is backscattered within the sensor optical fibre 16, and backscattered probe light is detected and analysed by the interrogator 20. The time delay between launching a pulse of probe light into the fibre and arrival back at the interrogator 20 of a particular portion of the backscattered probe light identifies the location along the fibre of the backscattering that gave rise to that portion of backscattered probe light. The nature of the backscattering, and hence properties of the backscattered light from any particular location along the sensor fibre, depend upon the properties of the sensor fibre at that location, which in turn is influenced by the environment around sensor optical fibre at that location.

The sensor fibre may be made up of a single length of a suitable optical fibre, or if necessary may comprise multiple joined lengths of optical fibre. Examples of optical fibre types which may be suitable for putting the invention into effect include single mode ITU-T G652 (SMF28), and multi-mode ITU-T G651 (graded index 50/125).

Data relating to the properties of the backscattered light is passed from the interrogator to an analyser 26 which derives information about the environment around the sensor optical fibre from the properties of the backscattered light. In particular, the flow of the fluid 12 causes vibrations at the sensor fibre 16 which influence backscattering of probe light within the sensor fibre, and the analyser derives a vibration signal both as a function of time and position along the sensor fibre. Sources of vibration in the flowing fluid 12 such as regions of turbulent flow move along the conduit 10 with the flowing fluid, and this gives rise to features in the derived vibration signal which change position with a velocity characteristic of the velocity of the flowing fluid. The analyser detects such moving features and automatically determines from their movement a measure of velocity of the fluid flow. Alternatively, the vibration signal may be displayed graphically and a measure of velocity of the fluid flow derived manually by a human operator.

The analyser may be implemented using computer apparatus, for example a suitably programmed general purpose computer such as a laptop or other PC, or a more specifically constructed data processing device, and may include input means such as a keyboard and pointer device, as well as visual display and other output means, for example to provide graphical indications of the vibration signal, the identified features, and determined measures of fluid flow as required. Data processing aspects of the interrogator 20 may be combined in with such computer apparatus.

The vibration signal may be indicative of an intensity or power of vibration across a wide frequency band, or features may be identified in more restricted or narrow frequency bands of vibration, or from combinations of sub features in multiple frequency bands. Features may be or include peaks, troughs, periodic signals of various other kinds, or any other features identifiable from the vibration signal which move or change in a way which is related to the fluid flow in a manner sufficiently consistent for a measure of the fluid flow to be derived.

Vibration signals may be derived from the properties of the backscattered probe light in a variety of ways. For example, a series of partially coherent laser pulses may be launched into an optical fibre, and the light which is received continuously at the launched end, as a result of Rayleigh backscatter from fibre inhomogeneities, can be observed. Pulses are launched at intervals greater than the time needed for light to reach the far end of the fibre and to return to the launched end. This prevents backscattered light being received from more than one pulse at a time. The backscattered signal detected at any instant corresponds to the vectorial sum of all of the components of the light reflected from the illuminated section of fibre at the location of the optical pulse. When the fibre is unperturbed, the time-resolved backscatter signature is random but stable. Any local external disturbance that changes the propagation constant of the fibre at a particular location perturbs the phase difference between the interfering waves at that location and can be detected as a modulation of the attenuation trace by comparing the signal before and after the action of the disturbance. When the fibre cable is stretched, for example, by the action of a vibrational force, the strain state of the fibre changes at the location of the vibration, disturbing the spatial distribution of the Rayleigh scattering centres. This in turn causes a change in the back-reflected self-interference signal, occurring only at the location of the perturbation, and this signal variation can be used to detect the existence and the character of the vibration. For more details on this technique, see WO 2006/048647 and WO 2008/056143.

Figure 2:
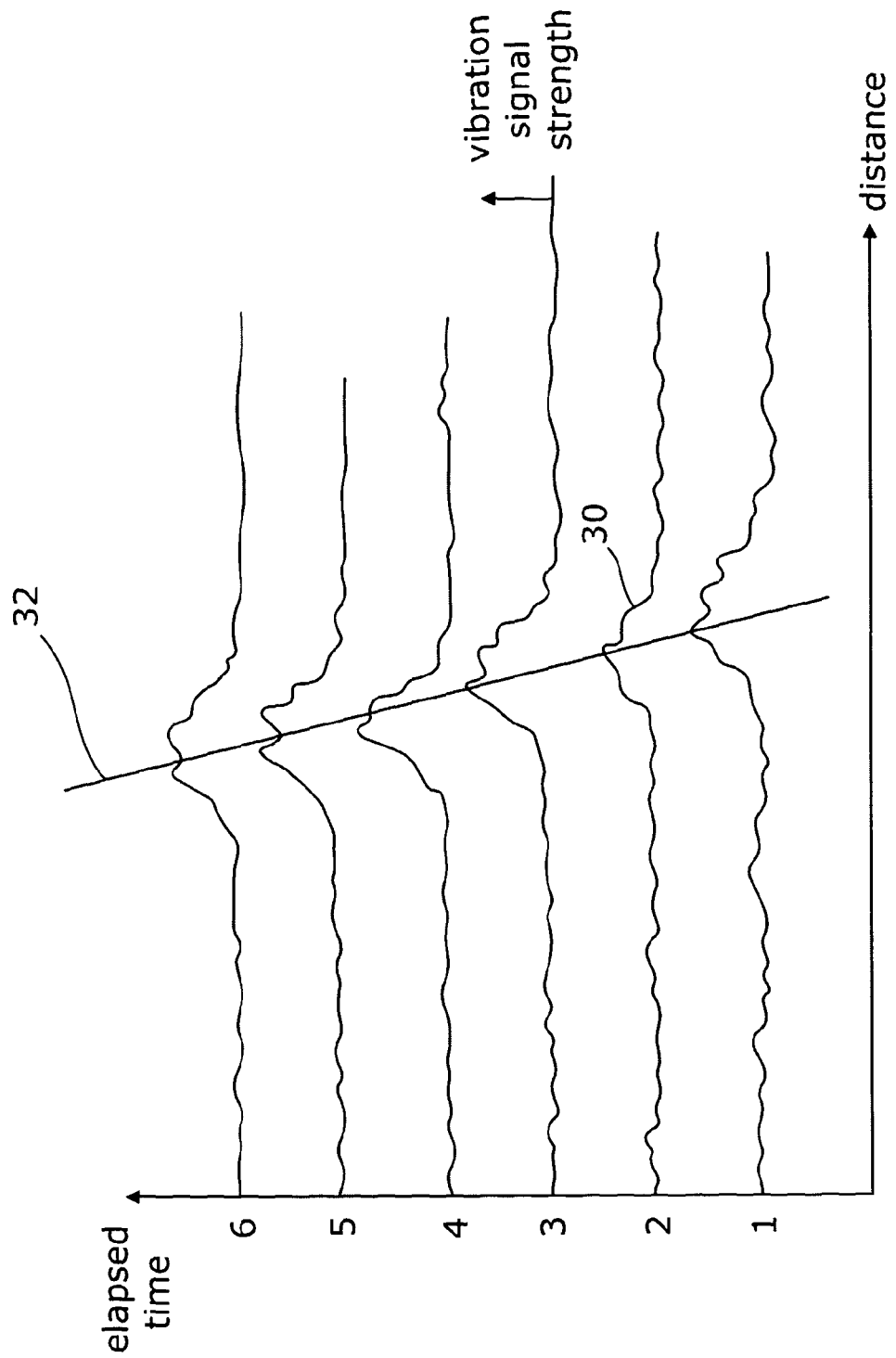
FIG. 2 shows how movement of a feature in a vibrational signal detected using the arrangement of FIG. 1 may be analysed to determine an indication of fluid flow.

FIG. 2 is a graph showing example vibration signals derived by the analyser 26, and shows how the analyser additionally determines a measure of fluid flow velocity from these signals. The abscissa of the graph represents a distance along the sensor optical fibre 16, which could, for example, equate to a range of depths of a few tens of meters within an oil well. The six curves show the detected vibration signal at successive time points, for example at intervals of one second, and the ordinate of the plotted data shows the strength of the detected vibration signal at each point in time and space. A particular feature in the vibration signal is a vibration signal peak 30, which might typically be a few meters long, and which is seen to move to smaller distances over time. The velocity of this movement is shown by gradient 32, which can be derived from the data by the analyser 26, for example by fitting a curve to the peak feature and using the apex of the fitted curve. The gradient 32 then provides a measure of velocity of the flowing fluid. Of course other features of the vibration signal such as minima, periodic signals, or any other detectable moving feature could be used to determine the measure of velocity.

The sensor optical fibre may be installed along the conduit in a variety of ways, although different techniques have advantages and disadvantages in respect of factors such as the intensity of coupling of fluid flow vibrations to the sensor fibre, likely erosion and damage to the sensor fibre, ease of installation, and so forth. Some suitable techniques for installing a sensor optical fibre in an oil or gas well include:

- running the sensor fibre in a stainless steel tube, for example of about 3 mm diameter, the tube being filled with a silicon oil, and installing the tube inside or outside of the well production tubing;
- running the sensor fibre in a 6 mm stainless steel control line filled with silicon oil or water, and installing the control line inside or outside the production tubing, or clamping the control line to another well insertion component;
- running the sensor fibre in a 14 mm carbon fibre rod pushed down through the production tubing;
- incorporating the sensor fibre into the well casing or externally to the well casing.

Figure 3:
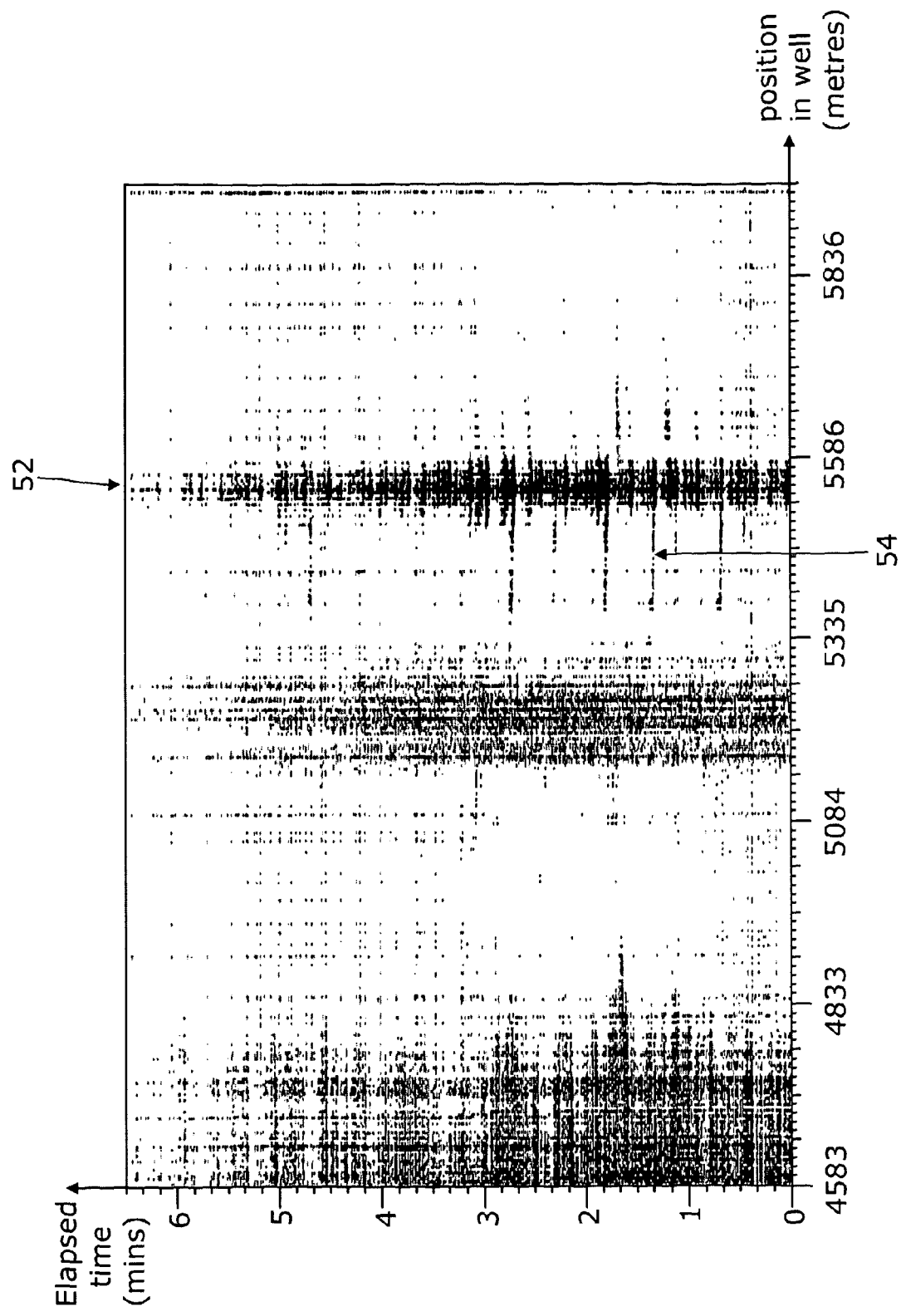
FIG. 3 illustrates the intensity of a vibrational signal determined as a function of time and distance along a gas well using an arrangement as illustrated in FIG. 1.

Example vibrational data derived using a distributed optical fibre sensor installed in a real tight gas production well is shown in FIG. 3. The well is 6000 m in length and of horizontal formation, descending vertically for approximately 3800 m after which the well path turns to run horizontally for the remaining 2200 m which forms the production zone. Within this production zone there are nine production stages of significant operational interest. A pre-existing optical fibre structure was housed in the well structure, which contained a suitable, single mode Corning SMF-28® optical fibre. An interrogator was coupled to the optical fibre and vibrational signals were acquired for the whole of the well profile. Vibrational events of interest, in which a feature in the vibrational signal moves along the fibre over time, were identified in production zones seven and nine, which were the only two zones found to be producing.

FIG. 3 is a plot where the grey scale density is indicative of vibrational intensity. The abscissa represents well depth from 4583 m to 5962 m and the ordinate represents increasing elapsed time. A number of ramp features can be seen adjacent to production zone nine which is characterised by a dark vertical band on the plot labelled 52, with distance from the production zone increasing with time both in an upwards (leftward movement on the graph) and downwards direction. A particular event of interest labelled as 54 on the plot comprises a peak in vibrational intensity which moves upwards in the well at a velocity of approximately 78.3 meters per second, indicating a corresponding velocity of fluid flow in that region of the well.

A range of modifications and variations may be made to the described embodiments without departing from the scope of the invention. For example the analyser 26 and interrogator 20 of FIG. 1 may be implemented in a single unit. The interrogator 20 may be implemented using an optical based sub-component coupled to a separate computer based signal processing sub-component, and these subcomponents may be provided in separate units suitably connected. Probe light pulses may be generated using a pulsed laser source or by modulation of continuous wave light.

The invention claimed is:

1. A method comprising:
   optically coupling an interrogator to an end of a sensor optical fibre disposed along a length of a conduit containing a fluid, to form a distributed optical fibre sensor;
   using the interrogator to measure vibration signals as a function of both time and distance along the fibre by detecting properties of light backscattered within the fibre;
   tracking movement along the optical fibre of at least one spatially localized feature in the vibration signals; and
   determining a measure of the fluid flow of the fluid along the conduit from said tracked movement.

2. The method of claim 1 wherein the spatially localized feature is a spatial peak in the vibration signal which moves along the sensor fibre over time.

3. The method of claim 1 wherein the measure of flow of the fluid along the conduit is determined from a rate of movement of the spatially localized feature along the sensor optical fibre.

4. The method of claim 1 wherein the measure of flow of the fluid along the conduit is a measure of velocity of the fluid flow along the conduit.

5. The method of claim 1 wherein the properties of light backscattered within the fibre are properties of light pulses Rayleigh backscattered within the sensor optical fibre.

6. The method of claim 1 wherein detecting properties of light backscattered within the fibre comprises using phase sensitive optical time domain reflectometry to detect self interference patterns of light pulses backscattered within the sensor optical fibre.

7. The method of claim 6 wherein the vibration signals are derived from changes between self interference patterns of successive light pulses.

8. The method of claim 1 wherein the conduit is a well bore.

9. The method of claim 8 wherein the sensor optical fibre is disposed within a tube, and the tube is installed along the well bore.

10. The method of claim 1 wherein the conduit is a pipeline.

11. The method of claim 1 wherein the detection of movement of at least one feature and determination of a measure of flow of the fluid along the conduit are carried out automatically by computer apparatus.

12. Apparatus for monitoring flow of a fluid along a conduit comprising:
   a sensor optical fibre disposed along said conduit which contains said fluid;
   a distributed optical fibre sensor optical interrogator for launching probe light pulses into said sensor optical fibre and to determine properties of said probe light backscattered within the sensor optical fibre, said properties being indicative of mechanical vibration as a function along said sensor optical fibre; and
   an analyser for automatically analyzing said properties so as to detect one or more spatially localised vibration features moving along said conduit, to track said one or more vibration features along said conduit, and to determine a measure of flow of the fluid along the conduit from the tracked movement of said one or more vibration features.

13. The apparatus of claim 12 wherein one or more of the vibration features are spatial peaks in a signal indicative of vibration, movement of the spatial peaks along the sensor fibre over time indicating the flow of the fluid.

14. The apparatus of claim 12 wherein the analyser is for determining the measure of flow of the fluid along the conduit from a rate of movement of the one or more vibration features along the sensor optical fibre.

15. The apparatus of claim 12 wherein the measure of fluid flow is a measure of velocity of the flow of the fluid along the conduit.

16. The apparatus of claim 12 wherein the optical interrogator is for determining properties of said probe light which has been Rayleigh backscattered within the sensor optical fibre.

17. The apparatus of claim 12 wherein the interrogator is for using phase sensitive optical time domain reflectometry to detect self interference patterns of said probe light pulses, and to determine said properties from said self interference patterns.

18. The apparatus of claim 12 wherein the conduit is a well bore.

19. The apparatus of claim 18 wherein the sensor optical fibre is disposed within a tube, and the tube is installed along the well bore.

20. The apparatus of claim 12 wherein the conduit is a pipeline.

21. A method comprising:
  using a distributed fibre optical sensor extending along a well bore to detect vibrational signals arising from flow of a fluid along the well bore;
  identifying one or more spatially localised features in said vibrational signals;
  tracking movement along the well bore of said spatially localised features; and
  monitoring flow of the fluid along the well bore using said tracked movement.

22. The method of claim 21 wherein said signals are signals indicative of mechanical vibration arising from said fluid flow.

23. The method of claim 21 wherein monitoring said fluid flow comprises determining a velocity of said fluid flow at a plurality locations along said well bore.

24. The method of claim 1 further comprising monitoring the fluid flow in a plurality of locations along said conduit using the steps of claim 1.

25. The method of claim 24 further comprising deriving a composite indication of fluid flow from a plurality of measures of fluid flow from the plurality of locations.

26. The method of claim 21 further comprising monitoring the fluid flow in a plurality of locations along said conduit using the steps of claim 21.

27. The method of claim 26 further comprising deriving a composite indication of fluid flow from a plurality of measures of fluid flow from the plurality of locations.

28. The method of claim 1 wherein said vibration signals arise from fluid flow in the conduit.

* * * * *